United States Patent
Sakharshete et al.

(10) Patent No.: US 11,657,119 B2
(45) Date of Patent: May 23, 2023

(54) HARDWARE ACCELERATED CONVOLUTION

(71) Applicant: Advanced Micro Devices, Inc., Santa Clara, CA (US)

(72) Inventors: Swapnil P. Sakharshete, La Jolla, CA (US); Samuel Lawrence Wasmundt, La Jolla, CA (US); Maxim V. Kazakov, La Jolla, CA (US); Vineet Goel, La Jolla, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 297 days.

(21) Appl. No.: 16/557,911

(22) Filed: Aug. 30, 2019

(65) Prior Publication Data
US 2020/0184002 A1    Jun. 11, 2020

Related U.S. Application Data

(63) Continuation-in-part of application No. 16/215,298, filed on Dec. 10, 2018, now Pat. No. 11,030,095.

(51) Int. Cl.
*G06F 17/16*    (2006.01)
*G06N 3/08*    (2023.01)

(52) U.S. Cl.
CPC .............. *G06F 17/16* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2006/0265445 A1 | 11/2006 | Gustavson et al. | |
| 2011/0153707 A1* | 6/2011 | Ginzburg | G06F 9/30036 708/523 |
| 2012/0011348 A1* | 1/2012 | Eichenberger | G06F 9/30014 712/222 |
| 2013/0262548 A1* | 10/2013 | Ge | G06F 7/52 708/520 |
| 2015/0324707 A1 | 11/2015 | Zhou | |
| 2016/0062947 A1* | 3/2016 | Chetlur | G06F 17/153 708/420 |
| 2016/0117255 A1 | 4/2016 | Marshall et al. | |
| 2016/0239706 A1* | 8/2016 | Dijkman | G06V 10/454 |

(Continued)

OTHER PUBLICATIONS

Chaos, Implement Convolution in CNN, Sep. 9, 2016; downloaded from: http://xuhan.me/2016/09/09/conv/, 5 pgs.

*Primary Examiner* — Elias Mamo
(74) *Attorney, Agent, or Firm* — Volpe Koenig

(57) ABSTRACT

A processing device is provided which includes memory configured to store data and a processor configured to determine, based on convolutional parameters associated with an image, a virtual general matrix-matrix multiplication (GEMM) space of a virtual GEMM space output matrix and generate, in the virtual GEMM space output matrix, a convolution result by matrix multiplying the data corresponding to a virtual GEMM space input matrix with the data corresponding to a virtual GEMM space filter matrix. The processing device also includes convolutional mapping hardware configured to map, based on the convolutional parameters, positions of the virtual GEMM space input matrix to positions of an image space of the image.

20 Claims, 5 Drawing Sheets

(56) References Cited

U.S. PATENT DOCUMENTS

| | | | |
|---|---|---|---|
| 2019/0065208 A1* | 2/2019 | Liu | G06N 3/063 |
| 2019/0190538 A1 | 6/2019 | Park et al. | |
| 2019/0205358 A1* | 7/2019 | Diril | G06N 3/063 |
| 2019/0325297 A1 | 10/2019 | Fowers et al. | |
| 2019/0340502 A1 | 11/2019 | Park et al. | |

* cited by examiner

HARDWARE ACCELERATED CONVOLUTION

This application is a continuation-in-part of U.S. patent application Ser. No. 16/215,298, filed on Dec. 10, 2018, which is incorporated by reference as if fully set forth.

BACKGROUND

Machine learning algorithms are utilized in neural networks to perform tasks such as, for example, image recognition, natural language processing, and game play. Neural network architectures include a stack of layers that implement functions to transform an input volume (such as a digital image) into an output volume (such as labeled features detected in the digital image). For example, the layers in a neural network can be separated into convolutional layers, pooling layers, and fully connected layers. Multiple sets of convolutional, pooling, and fully connected layers can be interleaved to form a complete neural network.

BRIEF DESCRIPTION OF THE DRAWINGS

A more detailed understanding can be had from the following description, given by way of example in conjunction with the accompanying drawings wherein.

DETAILED DESCRIPTION

Figure 1:
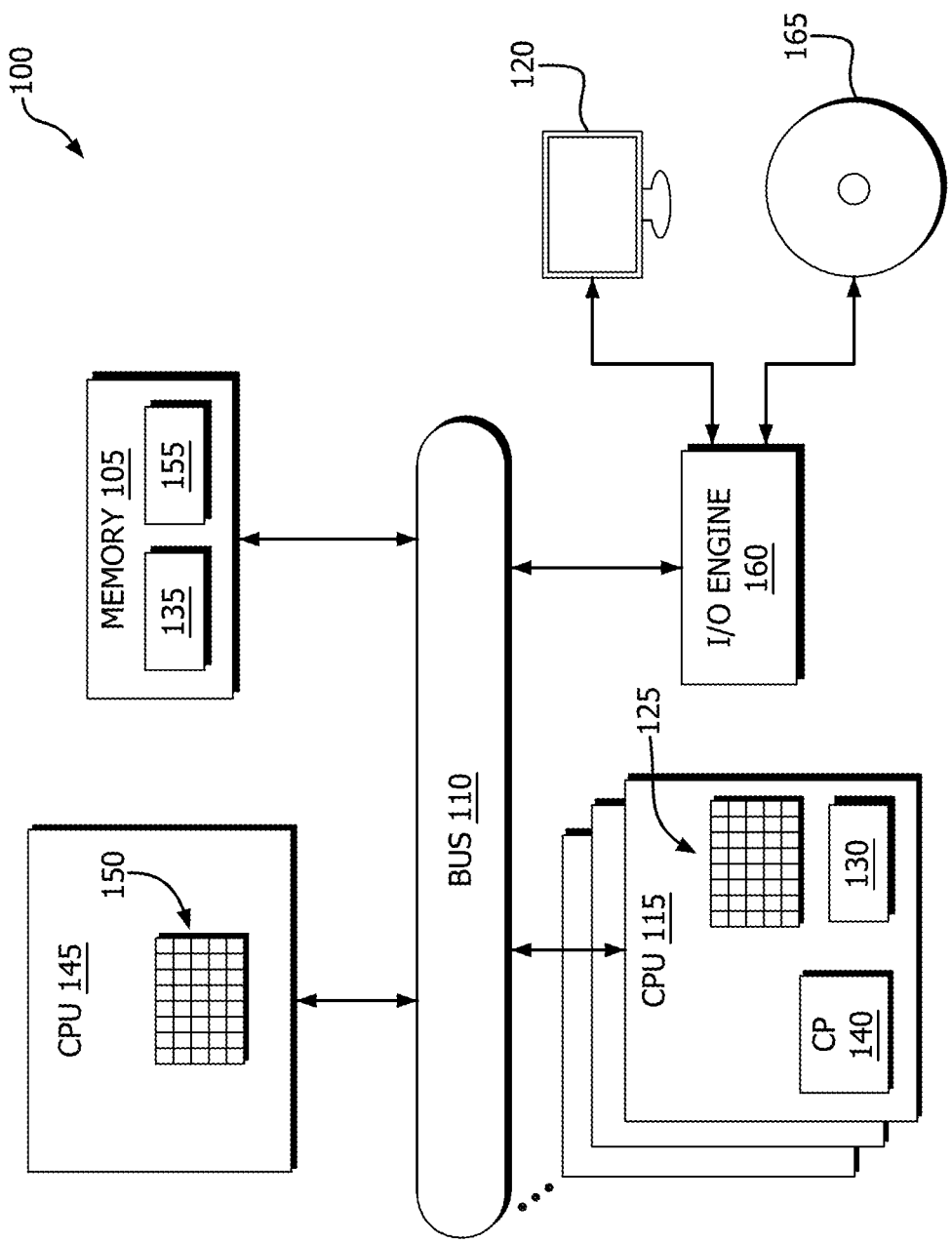
FIG. 1 is a block diagram of an example device in which one or more features of the disclosure can be implemented.

Convolution is frequently performed by machine learning algorithms in which the convolution of image data with a filter is converted to a matrix multiplication format. Conventional machine learning algorithms convert the convolution to matrix multiplication using operations such as "im2col," resulting in image matrices which are much larger than the original image data. For example, when image data is convolved with a three by three filter matrix, duplication of the original image data results in an image matrix that is nine times larger than the original image data. The increased amount of data (i.e., duplicative data) increases memory bandwidth consumption due to memory access requests by processors performing the convolution operations.

Features of the disclosure reduce memory bandwidth associated with conventional by using virtual matrices located in a virtual general matrix-matrix multiplication (GEMM) space in combination with input images located in an image space to assign convolution operations to various processors (e.g., compute units). A total result area in the virtual GEMM space of a virtual GEMM output matrix is determined based on convolutional parameters associated with the image in the image space. The total result area is partitioned into virtual segments and convolution operations are allocated to the processors based on each virtual segment. The virtual GEMM space is mapped to the image space. Duplicative data associated with the convolutional operations are fetched from an internal cache hierarchy that prevents duplicative requests to global memory from occurring.

Implementation of the mapping process (i.e., mapping the virtual GEMM space to the image space), via software, introduces address calculations, padding checks and insertions, which generates additional assembly instructions, resulting in an increase in power consumption to execute the additional instructions.

Features of the disclosure further reduce memory bandwidth and decrease power consumption by using convolutional mapping hardware dedicated to perform the mapping process from the virtual GEMM space to the image space. The convolutional mapping hardware is configured to accelerate the execution of the address calculations, padding checks, and insertions associated with the mapping process from the virtual GEMM space to the image space based on convolutional parameters and assumptions associated with the convolution which facilitate conversion of more expensive (e.g., consume more power to execute) operations, such as division and modulo operations, to less expensive operations, such as shift, addition and subtraction operations. That is, using these assumptions, the execution of the address calculations, padding checks and insertions is accelerated by assigning ranges for the input convolutional parameters.

A processing device is provided which includes memory configured to store data and a processor configured to determine, based on convolutional parameters associated with an image, a virtual general matrix-matrix multiplication (GEMM) space of a virtual GEMM space output matrix and generate, in the virtual GEMM space output matrix, a convolution result by matrix multiplying the data corresponding to a virtual GEMM space input matrix with the data corresponding to a virtual GEMM space filter matrix. The processing device also includes convolutional mapping hardware configured to map, based on the convolutional parameters, positions of the virtual GEMM space input matrix to positions of an image space of the image.

A processing device is provided which includes a first processor and a second processor in communication with the first processor. The second processor is configured to receive an image from the first processor. The second processor is also configured determine, based on convolutional parameters associated with an image, a virtual general matrix-matrix multiplication (GEMM) space of a virtual GEMM space output matrix and generate, in the virtual GEMM space output matrix, a convolution result by matrix multiplying the data corresponding to a virtual GEMM space input matrix with the data corresponding to a virtual GEMM space filter matrix. The processing device also includes convolutional mapping hardware configured to map, based on the convolutional parameters, positions of the virtual GEMM space input matrix to positions of an image space of the image.

A method is provided which includes receiving an image and determining, based on convolutional parameters associated with the image, a virtual general matrix-matrix multiplication (GEMM) space of a virtual GEMM space output matrix. The method also includes mapping, by convolutional mapping hardware based on the convolutional parameters, positions of a virtual GEMM space input matrix to positions of an image space of the image. The method further includes generating, in the virtual GEMM space output matrix, a convolution result by matrix multiplying the data corresponding to the virtual GEMM space input matrix with the data corresponding to a virtual GEMM space filter matrix.

FIG. 1 is a block diagram of an example device in which one or more features of the disclosure can be implemented. For processing device 100 is used to implement virtual GEMM space memory bandwidth reduction. Processing device 100 includes a central processing unit (CPU) 145, a memory 105, a bus 110, graphics processing units (GPU/s) 115, an input/output engine 160, a display 120, and an external storage component 165. GPU 115 includes a command processor 140, compute units 125, and internal (or on-chip) memory 130. CPU 145 includes processor cores 150. Memory 105 includes a copy of instructions 135 and program code 155. In various embodiments, CPU 145 is coupled to GPUs 115, memory 105, and I/O engine 160 via bus 110.

Processing device 100 has access to memory 105 or other storage component that is implemented using a non-transitory computer readable medium such as a dynamic random access memory (DRAM). However, memory 105 can also be implemented using other types of memory including static random access memory (SRAM), nonvolatile RAM, and the like.

Processing device 100 also includes bus 110 to support communication between entities implemented in processing device 100, such as memory 105. Some embodiments of processing device 100 include other buses, bridges, switches, routers, and the like, which are not shown in FIG. 1 in the interest of clarity.

Processing device 100 includes one or more GPUs 115 that are configured to perform machine learning tasks and render images for presentation on display 120. For example, GPU 115 can render objects to produce values of pixels that are provided to display 120, which uses the pixel values to display an image that represents the rendered objects. Some embodiments of GPU 115 can also be used for general purpose computing. For example, GPU 115 can be used to implement machine learning algorithms for various types of neural networks, such as, for example, convolutional neural networks (CNNs) or recurrent neural networks (RNNs). In some cases, operation of multiple GPUs 115 are coordinated to execute the machine learning algorithms when, for example, a single GPU 115 does not possess enough processing power to execute the assigned machine learning algorithms. The multiple GPUs 115 communicate using inter-GPU communication over one or more interfaces (not shown in FIG. 1 in the interest of clarity).

Processing device 100 includes input/output (I/O) engine 160 that handles input or output operations associated with display 120, as well as other elements of processing device 100 such as keyboards, mice, printers, external disks, and the like. I/O engine 160 is coupled to the bus 110 so that I/O engine 160 communicates with memory 105, GPU 115, or CPU 145. In the illustrated embodiment, I/O engine 160 is configured to read information stored on an external storage component 165, which is implemented using a non-transitory computer readable medium such as a compact disk (CD), a digital video disc (DVD), and the like. I/O engine 160 can also write information to the external storage component 165, such as the results of processing by GPU 115 or CPU 145.

Processing device 100 also includes CPU 145 that is connected to bus 110 and communicates with GPU 115 and memory 105 via bus 110. In the illustrated embodiment, CPU 145 implements multiple processing elements (also referred to as processor cores) 150 that are configured to execute instructions concurrently or in parallel. CPU 145 can execute instructions such as program code 155 stored in memory 105 and CPU 145 can store information in memory 105 such as the results of the executed instructions. CPU 145 is also able to initiate graphics processing by issuing draw calls, i.e., commands or instructions, to GPU 115.

GPU 115 implements multiple processing elements (also referred to as compute units) 125 that are configured to execute instructions concurrently or in parallel. GPU 115 also includes internal memory 130 that includes a local data store (LDS), as well as caches, registers, or buffers utilized by the compute units 125. Internal memory 130 stores data structures that describe tasks executing on one or more of the compute units 125.

In the illustrated embodiment, GPU 115 communicates with memory 105 over the bus 110. However, some embodiments of GPU 115 communicate with memory 105 over a direct connection or via other buses, bridges, switches, routers, and the like. GPU 115 can execute instructions stored in memory 105 and GPU 115 can store information in memory 105 such as the results of the executed instructions. For example, memory 105 can store a copy of instructions 135 from program code that is to be executed by GPU 115, such as program code that represents a machine learning algorithm or neural network. GPU 115 also includes coprocessor 140 that receives task requests and dispatches tasks to one or more of the compute units 125.

During operation of processing device 100, CPU 145 issues commands or instructions to GPU 115 to initiate processing of a kernel that represents the program instructions that are executed by GPU 115. Multiple instances of the kernel, referred to herein as threads or work items, are executed concurrently or in parallel using subsets of compute units 125. In some embodiments, the threads execute according to single-instruction-multiple-data (SIMD) protocols so that each thread executes the same instruction on different data. The threads are collected into workgroups that are executed on different compute units 125.

In various embodiments, CPU 145 provides an image to GPU 115. GPU 115 receives the image and stores the image in global memory of internal memory 130. Coprocessor 140 of GPU 115 evaluates the image in the image space for use in a virtual GEMM space. The image space is the space where the received image remains pixelated as an image and is distinct from the virtual GEMM space. The virtual GEMM space is a virtual space that includes virtual matrices whose dimensions are used to efficiently allocate convolution operations to compute units 125, as well as reduce the number of memory access requests to global memory.

GPU 115 generates the virtual matrices in the virtual GEMM space which include, for example, a virtual GEMM space matrix, a virtual GEMM space filter matrix, and a virtual GEMM space output matrix. Virtual GEMM space matrix, virtual GEMM space filter matrix, and virtual GEMM space output matrix are partitioned into virtual subsets or virtual segments. In various embodiments, partitioning the set of virtual matrices into virtual segments allows the convolution operation that is used extensively in machine learning algorithms to be divided into smaller operations. The pixelated data associated with the subsets or segments of the virtual matrices are matrix multiplied with the corresponding subsets of virtual filter matrices, instead of the entire matrix being multiplied by the entire filter matrix. Based on the partitioned virtual segments, coprocessor 140 allocates the convolution operations to compute units 125 whose associated caches, such as, for example, L1 caches, of internal memory 130 are used to cache the duplicative data that is retrieved from memory.

In order to reduce the number of memory access requests, the contents of the image matrices in virtual GEMM matrix space are mapped to the image data in image space using, for example, a mapping function or set of mapping functions. The mapping function or mapping operation allows for the mapping of pixels from the image space to the virtual GEMM matrix space (or vice-versa) that is a one-to-many mapping because each pixel in image space is duplicated multiple times to generate the matrices that are used to perform convolution by matrix multiplication. In some embodiments, because of the mapping function, compute units 125 make multiple memory access requests to retrieve values of each pixel from the memory only during the initial request. The subsequent requests to retrieve the value of the same pixel are served by, for example, the L1 cache associated with each compute unit of compute units 125. Thus, the compute unit of compute units 125 retrieves image data for duplicated pixels from its corresponding L1 cache instead of the global memory, which reduces memory access latency and the memory bandwidth for processing device 100.

In various embodiments, for example, a pixel value from the memory is stored in the L1 cache associated with a compute unit of compute units 125 the first time the compute unit retrieves the pixel value from memory. During the initial memory access, the memory access consumes the typical amount of memory bandwidth associated with accessing the pixel value. However, the pixel value is retrieved from the L1 cache each subsequent time the compute unit retrieves the pixel value to populate a duplicate pixel. The subsequent accesses do not consume memory bandwidth associated with the first memory access. Thus, the memory bandwidth consumed by the machine learning algorithms being implemented in processing device 100 is reduced, which allows the machine learning algorithm to benefit from hardware acceleration of matrix multiplications by acquiring image data on-the-fly to populate virtual GEMM space matrices that are used to perform convolution by matrix multiplication with a corresponding virtual GEMM space filter matrix.

Figure 2:
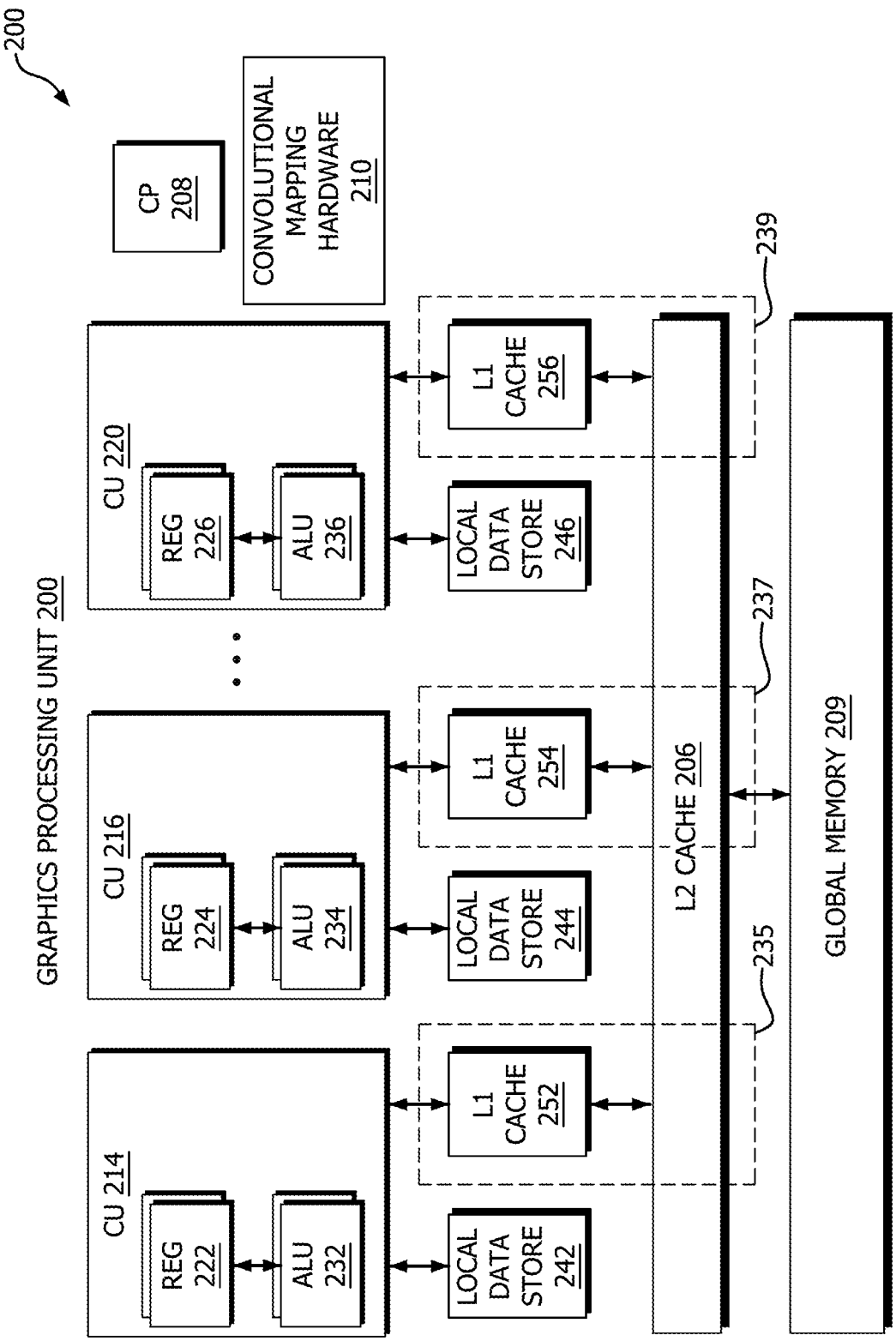
FIG. 2 is a block diagram illustrating exemplary components of a processing device in which one or more features of the disclosure can be implemented.

FIG. 2 is a block diagram of a graphics processing unit (GPU) 200 implementing virtual GEMM space memory bandwidth reduction in accordance with some embodiments. GPU 200 includes a compute unit 214, a compute unit 216, a compute unit 220, a local data store 242, a local data store 244, a local data store 246, an L1 cache 252, an L1 cache 254, an L1 cache 256, an L2 cache 206, a global memory 209, an internal cache hierarchy 235, an internal cache hierarchy 237, an internal cache hierarchy 239, command processor 208 and convolutional mapping hardware 210. Compute unit 214 includes an arithmetic logic unit (ALU) 214 and register files 222. Compute unit 216 includes an arithmetic logic unit (ALU) 234 and register files 224. Compute unit 220 includes an arithmetic logic unit (ALU) 236 and register files 226. In various embodiments, compute unit 214 is coupled to (or associated with) local data store 242 and cache 252. Compute unit 216 is coupled to (or associated with) local data store 244 and cache 254. Compute unit 220 is coupled to (or associated with) local data store 246 and cache 256.

The plurality of compute units 214, 216, 220 (collectively referred to herein as "compute units 214-220") are used to execute threads of a workgroup concurrently or in parallel. For example, compute units 214-220 can execute instructions in the same kernel using different input data to generate different output results. Compute units 214-220 are each associated with register files 222, 224, 226 (collectively referred to herein as "register files 222-226"). Register files 222-226 are arrays of processor registers in GPU 200 that are used to store information that define a context of the corresponding compute units 214-220 while executing instructions in a thread. Values are stored in the register files 222-226 in response to threads being scheduled for execution on the compute units 214-220. The values can be modified by the compute units 214-220 to reflect the changing context of the compute units 214-220 in response to execution of instructions on compute units 214-220. The values stored in register files 222-226 are copied to an external memory (such as the memory 105 shown in FIG. 1). The values are then erased from the register files 222-226 (or written over by new context information for a different instruction or workgroup) in response to preemption of instructions or workgroups executing in the GPU 200.

Compute units 214-220 include ALU 232, ALU 234, and ALU 236 (collectively referred to herein as "arithmetic logic units 232-236"). Arithmetic logic units 232-236 include general purpose hardware configured to perform arithmetic operations for matrix multiplication. The general purpose hardware includes combinational logic circuitry (e.g., transistors, such as metal oxide field transistors (MOSFETs). Deep learning operations performed by processing device 100 utilize machine learning algorithms that are converted to matrix multiplication form to utilize the hardware acceleration provided by arithmetic logic units 232-236.

In addition to the general purpose logic hardware configured to perform arithmetic operations for matrix multiplication, GPU 200 also includes convolutional mapping hardware 210 (e.g., combinational logic circuitry) dedicated to perform the mapping process from the virtual GEMM space to the image space. As described in more detail below, the convolutional mapping hardware is configured to accelerate the execution of address calculations, padding, checks, and insertions associated with the mapping process from the virtual GEMM space to the image space.

In the example shown in FIG. 2, the convolutional mapping hardware 210 is separate from (e.g., shared by) each CU 220. Additionally or alternatively, arithmetic logic units 232-236 include convolutional mapping hardware. As described in more detail below, the convolutional mapping hardware 210 is used, along with the general purpose hardware, to perform convolution as matrix multiplication more efficiently than if the mapping was performed with software.

Local data store 242, local data store 244, and local data store 246 (collectively referred to herein as "local data stores 242-246") are used to store data that is generated by or used by compute units 214-220. Some embodiments of local data stores 242-246 are partitioned to provide separate regions for each of compute units 214-220. Local data stores 242-246 are also used to facilitate exchange or sharing of data between compute units 214-220. Data associated with threads of a workgroup are stored in local data stores 242-246 in response to threads being scheduled for execution on compute units 214-220.

GPU 200 also implements internal cache hierarchy 235, internal cache hierarchy 237, and internal cache hierarchy 239 (collectively referred to herein as "internal cache hierarchy 235-239"), that includes one or more levels of cache, e.g., L1 cache and L2 cache, that are used to cache instructions or data for duplicative data or data of relatively low latency access by compute units 214-220. Internal cache hierarchy 235 includes a number of individual caches and corresponding cache locations. GPU 200 includes a cache controller (not shown) for controlling movement of data between levels of internal cache hierarchy 235, as well as movement of data between internal cache hierarchy 235, global memory 209, and memory 105, as described further below.

During operation of GPU 200, GPU 200 receives an input image in the form of batches and corresponding filters from, for example, CPU 145. GPU 200 stores the image data and filter data in global memory 209. The input image data provided from CPU 145 is, for example, in NCHW format, or alternatively, in NHWC format, where N represents the number of images in a batch, H refers to the number of pixels in the vertical (height) dimension, W represents the number of pixels in the horizontal (width) dimension, and C refers to the channels. When GPU 200 receives the input image and the image is not in NHWC format (e.g., the image is in NCHW format), command processor 208 of GPU 200 converts the image into NHWC format for use by GPU 200. In various embodiments, the image in NCHW format includes a padding parameter that is also converted to NHWC format.

For simplified explanation, features of the disclosure include NCHW and NHWC as example memory formats. Features of the disclosure can, however, be implemented using any type of linearization of the memory.

In various embodiments, in order to facilitate memory bandwidth reduction, command processor 208 ascertains the convolutional parameters that are convolution characteristics associated with the input image. Command processor 208 uses the convolutional parameters to determine a total result area of a virtual GEMM space output matrix. In various embodiments, the convolutional characteristics for the input image within the batch N include, for example, as stated previously, input image height, width, channel depth, filter height, width, stride in width, stride in height. Command processor 208 determines the total result area by ascertaining K (the number of output filters) and N (the batch size) from the convolutional parameters, and by computing the parameters P and Q, which are the convolved output images height and width, respectively. Based on the parameters P and Q and the convolutional parameters N and K, command processor 208 is able to ascertain NPQ×K, which is the total result area of the virtual GEMM space output matrix.

In various embodiments, P and Q are calculated for each kernel set which ranges over K. For example, the height P and width Q are calculated from the convolutional parameters which include the input image height H, input image width W, input channel depth C, input image padding along height Ph, input image padding along width Pw, filter height R, filter width S, filter stride along width U and filter stride along height V as P=floor((H−R+2*Ph)/v)+1 and Q=floor((W−S+2*Pw)/u)+1. Using the values of P and Q, command processor 208 then computes the total result area in the virtual GEMM space using dimensions NPQ×K.

Command processor 208 ascertains the value of the total result area and partitions the total result area into a plurality of virtual segments. In various embodiments, the dimensions of the virtual segments depend upon the total number of compute units and the total result area. That is, the dimensions of the virtual segments are calculated by taking the square root of the total result area of virtual GEMM output matrix divided by the number of compute units 214-216 of GPU unit 200. The total result area of virtual GEMM output matrix is computed by multiplying the first dimension of virtual GEMM output matrix (i.e., NPQ) times the second dimension of virtual GEMM output matrix (i.e., K). For example, assume the number of compute units available to GPU 200 is 64. When NPQ equals 128 and K equals 128, the total result area of virtual GEMM output matrix is 16,384. The total result area of virtual GEMM output matrix, 16,384, divided by the number of available compute units, 64, is 256. The square root of 256 is 16, which are the dimensions of the virtual segment. That is, the dimensions (a×b) of the virtual segment are 16×16. Based on the partitioning of the total result area, command processor 205 is able to divide the convolution operation into smaller operations in which a subset of the virtual GEMM space matrix is matrix multiplied with a corresponding subset of the virtual GEMM space filter matrix.

In various embodiments, when there is not an exact square root of the total result area of virtual GEMM output matrix divided by the number of compute units 214-216, GPU 200 selects square values that closely approximate to the total result area of virtual GEMM output matrix divided by the number of compute units. That is, an estimate is made by GPU 200 of multiples whose values closely square to the total result area of virtual GEMM output matrix divided by the number of compute units. In various embodiments, the approximated values may be within +−1, +−2, +−3, or +−4 integer units of the multiple, depending on, for example, design approximations. For example, if the total result area of virtual GEMM output matrix divided by the number of compute units is 240, GPU 200 selects+−1 as the estimated range and selects multiples 15 and 16 as the approximated values that yield 240. As a result, the values 15 and 16 are selected for the dimensions (a×b) of the virtual segments.

Command processor 208 provides the virtual segment dimensions to the kernel executing or running on, for example, compute units CU 214-220. Command processor 208 uses the virtual segment dimensions to attain the dimensions (a×RSC) of a virtual GEMM space matrix segment and the dimensions (RSC×b) of virtual GEMM space filter matrix segment. Once the dimensions of virtual GEMM space matrix segment and virtual GEMM space filter matrix segment are known, convolutional mapping hardware 210 uses the virtual 2-D points (x, y) of each virtual GEMM space matrix segment (a×RSC) in the virtual GEMM space matrix and maps each point from the virtual GEMM space matrix to a pixel (n, h, w, c) in the original input image in the image space in global memory 209. As described in more detail below, the addresses for the input filter matrix are calculated via general purpose hardware (e.g., in arithmetic logic units 232-236) in parallel with the mapping performed by the dedicated convolutional mapping hardware 210, resulting in a more efficient convolution operation than when dedicated convolutional mapping hardware 210 is not used to perform the mapping.

In various embodiments, as the input image located in the image space has remained in (n, h, w, c) format, mappings are created from the (x, y) position of the virtual GEMM space matrix segment to the (n, h, w, c) position of the image in the image space. Thus, command processor 208 only requests specific memory values that are needed to make up the virtual GEMM space matrix segment and the virtual GEMM space filter matrix segment that are currently being utilized. In various embodiments, the mappings or mapping functions used to map (x, y) from the virtual GEMM space to (n, h, w, c) in the image space are, for example:

int $n=y/(P*Q)$;

int $c=x\%C$;

int $h=((y\%(P*Q))/Q)*v+x/(S*C)$;

int $w=(((y\%Q)*u*C)+(x\%(S*C)))/C$.

After the (x, y) position of the virtual GEMM space matrix segment is mapped to the (n, h, w, c) position of the image in the image space, command processor 208 fetches data associated with virtual GEMM space matrix segment by linearizing the pixel coordinate (n, h, w, c) to create an address into the input image memory. Duplicate data in the virtual GEMM space maps to the same addresses causing data to be fetched from the internal cache hierarchy, e.g., L1 cache 252 and L2 cache 206. Command processor 208 fetches data associated with virtual GEMM space filter matrix segment from memory for matrix multiplication.

During the convolutional process, compute units 214-220 make multiple memory fetch requests to retrieve values of each pixel from global memory 209. However, only the initial request to retrieve the value of a pixel is served by global memory 209, the subsequent requests to retrieve the value of the same pixel are served by, for example, each L1 cache and L2 cache associated with compute units 214-220. Thus, for example, compute unit 250 retrieves image data for duplicated pixels from its corresponding associated L1 cache 250 instead of global memory 209.

Once the data has been fetched corresponding to the virtual GEMM space matrix segment and the virtual GEMM space filter matrix, the data fetched for virtual GEMM space matrix segment is matrix multiplied with data fetched for virtual GEMM space filter matrix segment in the corresponding compute unit to generate the convolution result in virtual GEMM space output matrix. The final result is a combination of the matrix multiplication results of each compute unit and is the convolution output provided to virtual GEMM space output matrix. The convolution output is then transformed from NPQ×K to (N, K, P, Q) for use by, for example, GPU 200.

Figure 3:
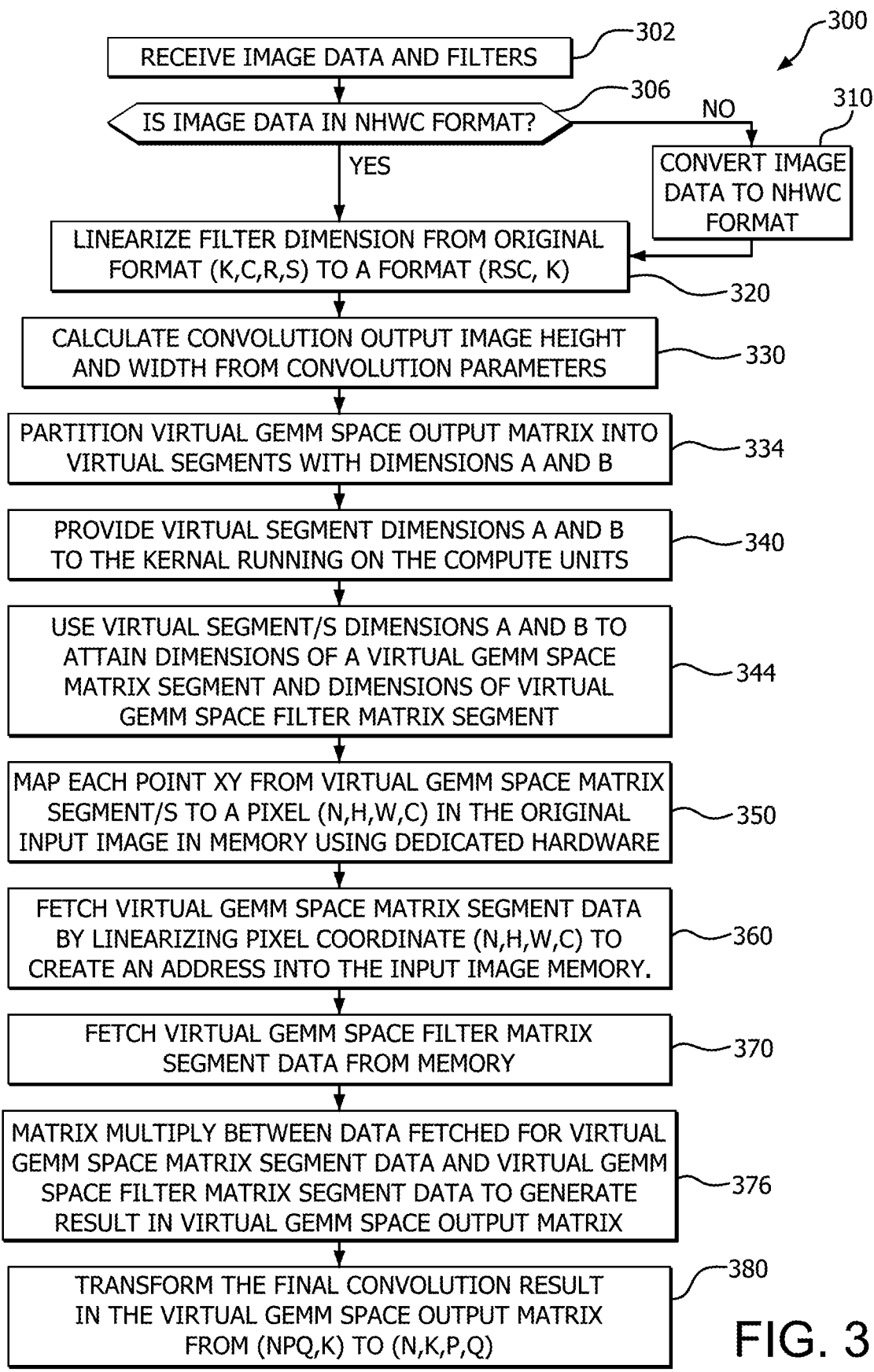
FIG. 3 is a flow diagram illustrating an example method according to features of the disclosure.

FIG. 3 is a flow diagram illustrating a method for performing virtual GEMM space memory bandwidth reduction in accordance with some embodiments. The method 300 is implemented in some embodiments of processing device 100 shown in FIG. 1 and GPU 200 shown in FIG. 2.

In various embodiments, the method flow begins with block 302. At block 302, GPU 200 receives image data in the form of batches and filters from, for example, CPU 145. At block 306, a determination is made by GPU 200 as to whether the image data is in NHWC format, where N is the batch size, C is the number of input channels, H is the height of the input image, and W is the width of the input image. When the image data is not in NHWC format, such as, for example, NCHW format, the image data is converted to NHWC format in block 310.

When the image data is in NHWC format, at block 320, the dimension of an image space filter is linearized using the filter dimensions of the original format (e.g., a 4-D filter dimension) KCRS to virtual GEMM space filter matrix form with a dimension of RSC×K. In various embodiments, the image space filter is linearized by, for example, concatenating the dimensions of R, S, and C.

At block 330, the height P and width Q of the convolution output image are calculated. In various embodiments, the height P and width Q are calculated from convolutional parameters that allow for the determination of matrix multiplication virtual result output for virtual GEMM space output matrix with dimensions NPQ×K.

At block 334, the total result area of virtual GEMM output matrix is partitioned into virtual segments with dimensions a×b, where a is the height of the virtual segment and b is the width of the virtual segment. In various embodiments, to compute the total result area of virtual GEMM output matrix, the dimensions of virtual GEMM space output matrix are multiplied together to yield the total result area, i.e., NPQ multiplied by K gives the total result area NPQ×K. In various embodiments, a and b are calculated by taking the square root of the total result area of virtual GEMM output matrix divided by the number of compute units of GPU unit 200. The total result area of virtual GEMM output matrix is computed by multiplying a first dimension of virtual GEMM output matrix (i.e., NPQ) times a second dimension of virtual GEMM output matrix (i.e., K).

At block 340, virtual segment dimensions a×b are provided to the kernel executing or running on, for example, compute units CU 214-220. At block 344, the virtual segment dimensions a and b of virtual GEMM space output matrix are used to attain dimensions a×RSC of virtual GEMM space matrix and the dimensions RSC×b of virtual GEMM space filter matrix.

At block 350, once the dimensions of virtual GEMM space matrix and virtual filter matrix are known, the 2-D points (x, y) of each virtual segment a×RSC in virtual GEMM space matrix are mapped from the virtual GEMM space matrix to a pixel (n, h, w, c) in the original input image in the image space in memory.

As described above, the mapping process from the virtual GEMM space to the image space is implemented using convolutional mapping hardware (e.g., 210) dedicated to perform the mapping process from the virtual GEMM space to the image space. The convolutional mapping hardware is configured to accelerate the execution of address calculations, padding, checks, and insertions associated with the mapping process from the virtual GEMM space to the image space. The convolutional mapping hardware is used, along with the general purpose hardware, to perform convolution as matrix multiplication more efficiently than mapping from the virtual GEMM space to the image space via software.

The convolutional mapping hardware receives input convolutional parameters which include the x, y, position of the virtual GEMM space matrix segment, the input batch size N, the number of input channels (i.e., input channel depth) C, the input image height H the input image width W, the height P and width Q of the convolved output matrix, the input image padding along height Ph, the input image padding along width Pw, the height R and width S of the filter and hyper parameters such as width u and height v, which can be assigned values per portion of a program to be executed.

Based on the received input convolutional parameters, the convolutional mapping hardware maps the virtual GEMM space matrix segment to the image space by returning an n, h, w, c address for each pixel, where n is the batch number to which the pixel is mapped, h is the image height H to which the pixel is mapped, w is the image width W to which the pixel is mapped and c is the input channel depth to which the pixel is mapped.

The convolutional mapping hardware includes address calculation logic as well as padding check logic to perform the mapping. For example, the convolutional mapping hardware includes address calculation logic which generates the n, h, w, c coordinate by performing address calculations according to the following:

$$N = y/(P*Q)$$

$$C = x \% C$$

$$H = ((y\%(P*Q))/Q)*v + x/(S*C)$$

$$W = (((y\%Q)*u*C) + (x\%(S*C)))/C$$

The convolutional mapping hardware includes padding check logic which determines whether to initiate a memory access request for data (e.g., perform a memory look-up) corresponding to a position in the image space or return a value=0 and not initiate a memory access request. For example, if the padding check logic determines that the n, h, w, c coordinate is out of bounds (i.e., is a portion in the NHWC space comprising padded data), then the convolutional mapping hardware returns a value=0 and a memory access request for data corresponding to the out of bounds n, h, w, c coordinate is not initiated. The padding checks include combinational logic (e.g., comparators, ands, ors, adds, and the like) used to dynamically check if the received hardware address (n, h, w, c) is out of bounds within the image input. The padding parameters can vary across layers. The padding check logic of the convolutional mapping hardware performs the padding check, for example, according to the following instruction:

if    (*wPadCheck<padW||*wPadCheck>=(W+padW) ||*hPadCheck<padH||*hPadCheck>=(H+padH))

where W is the image width, H is the image height, padW is the padding on the outside of the image along the width, padH is the padding on the outside of the image along the height, wPadCheck is the computed address 'w' to be checked if it is within bounds, hPadCheck is the computed address 'h' to be checked if it is within bounds. The instruction is used to determine if either the 'h' or 'w' computed value is out of bounds to the left, to the right, below, or above the image.

In addition, the convolutional mapping hardware is, for example, configured to efficiently map the x, y coordinates from the virtual GEMM space to the n, h, w, c coordinates in the image space utilizing assumed constant values uniquely associated with the convolution. These assumptions facilitate conversion of more expensive (e.g., consume more power to execute) operations, such as division and modulo operations, to less expensive operations, such as shift, addition and subtraction operations. Examples of these assumed constant values include:

PQ—16 bit;
    $\log_2(C)$—4 bit;
    Q—8 bit;
    log 2(u)—1 bit;
    log 2(v)—1 bit;
    padh—2 bit;
    padw—2 bit;
    H—8 bit;
    W—8 bit;
    S—8 bit; and
    dgrad_str2—1 bit At block 360, virtual GEMM space matrix data is fetched by linearizing pixel co-ordinate (n, h, w, c) to create an address into the input image memory 205. Duplicate data in virtual GEMM space is mapped to the same addresses causing data to be fetched from internal cache hierarchy, such as, for example, L1 cache 252 and L2 cache 252.

At block 370, virtual GEMM space filter matrix data is fetched from the memory.

At block 376, data fetched for virtual GEMM space matrix segment is matrix multiplied with data fetched for virtual GEMM space filter matrix segment to generate the convolution result in virtual GEMM space output matrix. At block 380, the convolution result in virtual GEMM space output matrix is transformed from NPQ×K to (N, K, P, Q), i.e., image space form, for use by, for example, GPU 200.

Figure 4:
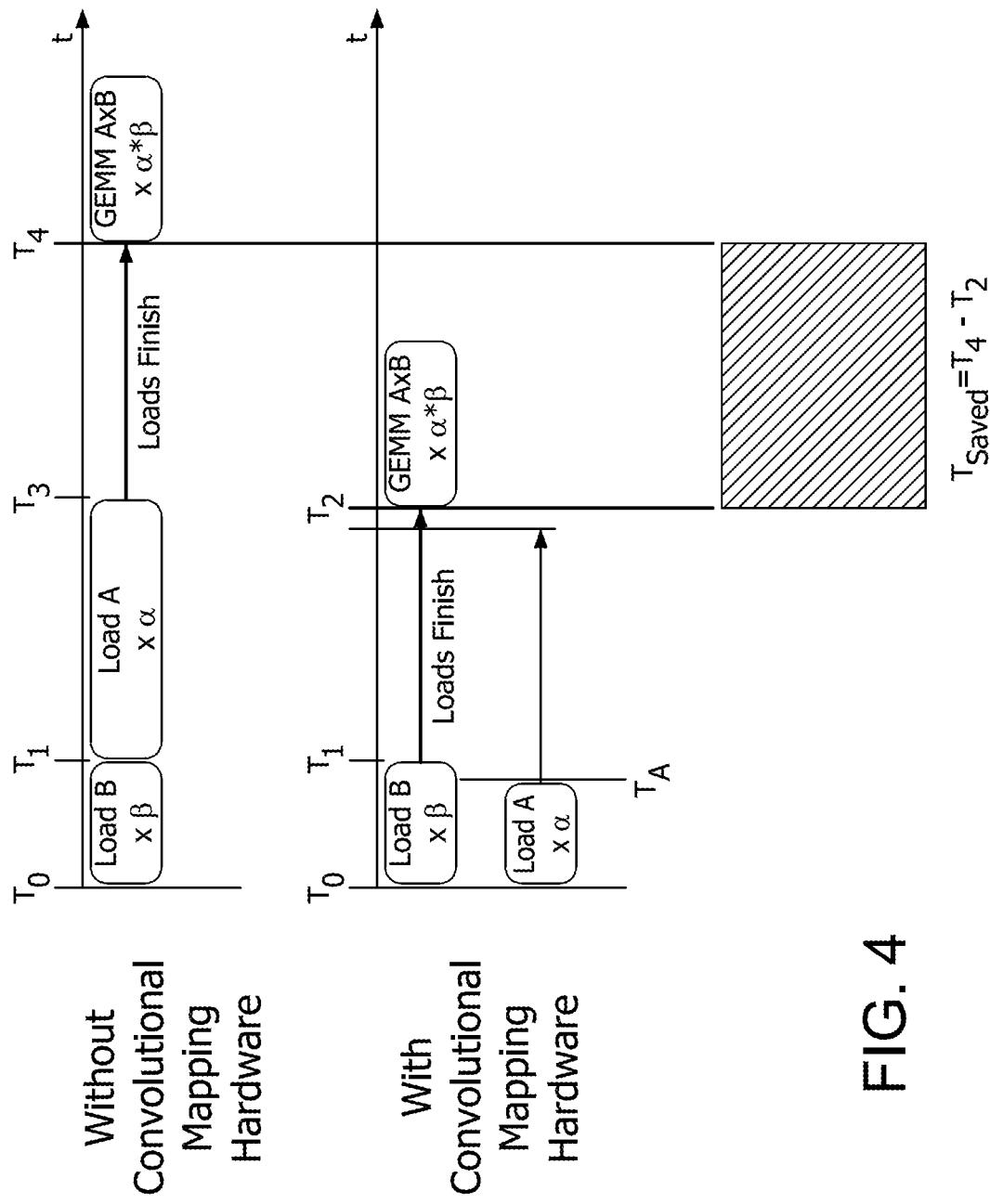
FIG. 4 is a timing diagram illustrating efficient convolution, as matrix multiplication, of image data with a filter using dedicated convolutional mapping hardware.

FIG. 4 is a timing diagram 400 illustrating efficient convolution, as matrix multiplication, of image data with a filter over time t using convolutional mapping hardware (e.g., 210) dedicated to perform the mapping process from the virtual GEMM space to the image space. The timing diagram 400 illustrates a comparison between performing the mapping process without the dedicated convolutional mapping hardware and performing the mapping process with the dedicated convolutional mapping hardware. The top portion of the timing diagram in FIG. 4 illustrates the mapping process without using dedicated convolutional mapping hardware. The bottom portion of the timing diagram in FIG. 4 illustrates the mapping process using dedicated convolutional mapping hardware. Time t is, for example, a number of clock cycles or real time (e.g., milliseconds).

As shown in the top portion of the timing diagram 400, address calculations for ß filter blocks (i.e., weight blocks) of the input filter matrix B are performed (i.e., Load B×ß) from time $T_0$ to time $T_1$. The address calculations for α image blocks of input image matrix A, which include the mapping from the virtual GEMM space to the image space, are performed (i.e., Load A×α) from time $T_1$ to time $T_3$ When the address calculations for filter matrix B and image matrix A completes at time $T_3$, the data fetched for the virtual GEMM space matrix segment is matrix multiplied with data fetched for virtual GEMM space filter matrix segment and the convolution result is generated in virtual GEMM space output matrix at time $T_4$.

That is, when the dedicated convolutional mapping hardware is not used as shown in the top portion of the timing diagram, the address calculations for filter matrix B and image matrix A are performed sequential to each other. The address calculations for input filter matrix B are performed using general purpose hardware. The more complex address calculations, including the padding checks and insertions used to map the virtual GEMM space to the image space, for input image matrix A are performed via programmed instructions.

As shown in the bottom portion of the timing diagram 400, the address calculations for filter matrix B are performed in parallel with the address calculations for input image matrix A used to map the virtual GEMM space to the image space. The address calculations for input filter matrix B are performed using general purpose hardware. In contrast to using the programmed instructions to perform the more complex address calculations for input image matrix A, these more complex address calculations are performed using the additional convolutional mapping hardware dedicated to performing these complex address calculations as part of the mapping process from the virtual GEMM space to the image space.

Because the address calculation for matrices A and B are performed in parallel, the address calculations for matrices A and B are completed at an earlier time $T_1$, than the time $T_3$ to complete the address calculations for matrices A and B when the convolutional mapping hardware is not used. As further shown in the bottom portion of the timing diagram 400, because the address calculations are completed at time $T_A$ for filter matrix A and the address calculations are completed at time $T_1$ for filter matrix B, there is a slight delay (time difference between $T_1$ and $T_A$) before the loading can complete. This delay is negligible, however, compared to the time saved by performing the address calculations for matrices A and B in parallel.

In addition, because the mapping process from the virtual GEMM space to the image space is performed using the dedicated convolutional mapping hardware, in some examples the complex addresses are calculated for image matrix A in less time than when the dedicated convolutional mapping hardware is not used. For example, as shown in FIG. 4, the time period (T0 to TA) to calculate the addresses for image matrix A using the convolutional mapping hardware is less than the time period (T1 to T3) to calculate the addresses for image matrix A without using the convolutional mapping hardware. The amount of time saved by the convolutional mapping hardware to perform the calculations varies. For example, the mapping process can warrant that the same calculations be performed by the convolutional hardware as the original hardware. The time saved by performing the address calculations for matrices A and B in parallel, however, still exists.

Because the address calculation for matrices A and B are performed in parallel and the complex addresses are, for example, calculated for image matrix A in less time when the convolutional mapping hardware is used, the convolution as matrix multiplication is performed more efficiently (e.g., in less time and with less power consumption) than when the convolutional mapping hardware is not used. For example, as shown in the timing diagram 400, the convolution result is generated in virtual GEMM space output matrix at time $T_4$ when the convolutional mapping hardware is not used and the convolution result is generated in virtual GEMM space output matrix at time $T_2$ when the convolutional mapping hardware is used. That is, the convolution result is generated at an earlier time $T_2$ when using the dedicated convolutional mapping hardware along with the general purpose matrix multiplication hardware than at time $T_4$ when the dedicated convolutional mapping hardware is not used. Accordingly, the time saved ($T_{Saved}$) to perform the convolution as matrix multiplication when using the dedicated convolutional mapping hardware is equal to the time difference between $T_4$ and $T_2$.

Figure 5:
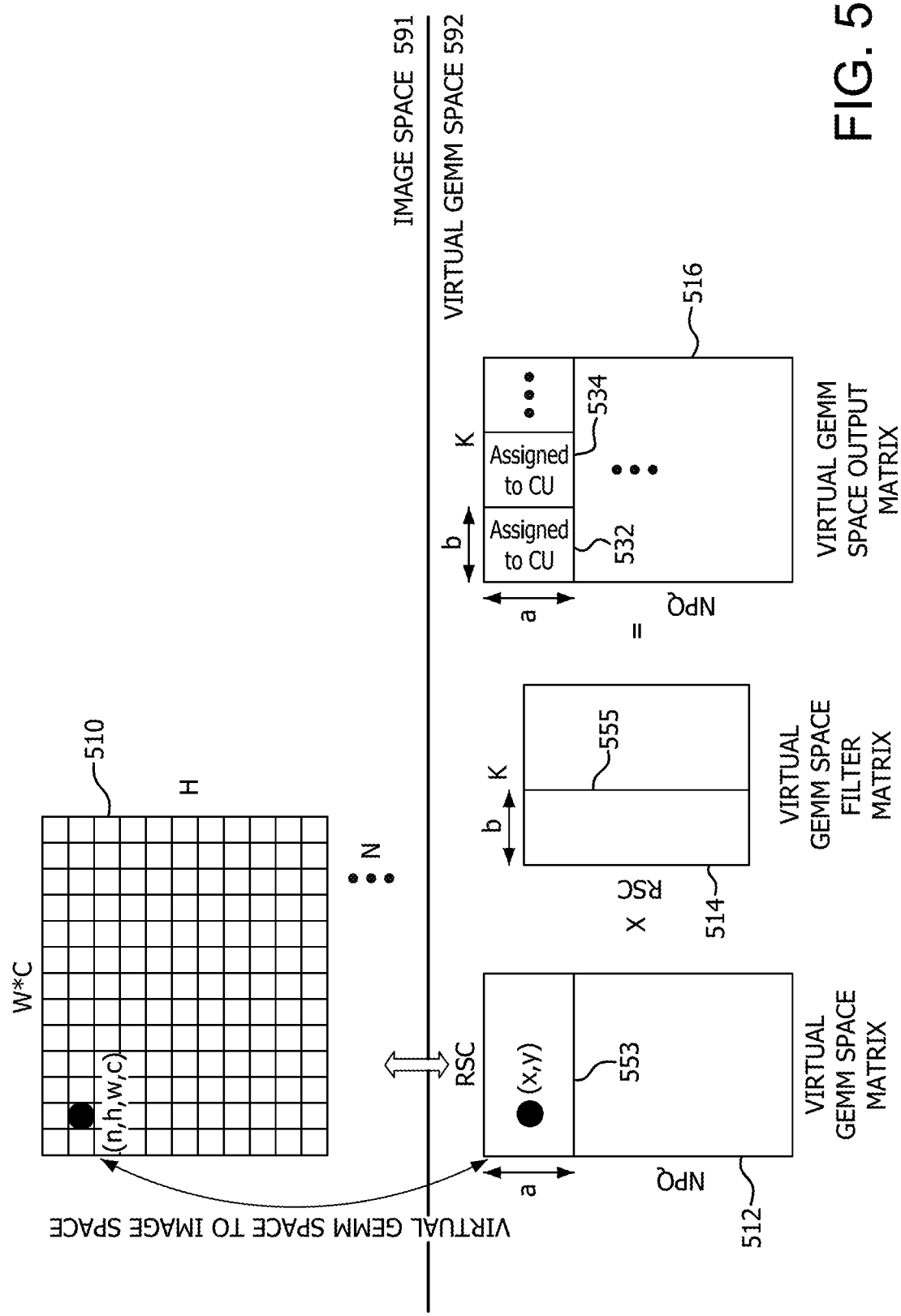
FIG. 5 illustrates a virtual GEMM space implementation of memory bandwidth reduction according to features of the disclosure.

FIG. 5 illustrates a virtual GEMM space implementation of memory bandwidth reduction according to features of the disclosure. FIG. 5 includes an image space 591 and a virtual GEMM space 592. Image space 591 includes an image 510. Virtual GEMM space 592 includes a virtual GEMM space matrix 512, a virtual GEMM space matrix filter 514, and a virtual GEMM space output matrix 516. Virtual GEMM space matrix 512 includes a virtual GEMM space segment 553. Virtual GEMM space filter matrix 514 includes a virtual GEMM space filter matrix segment 555. Virtual GEMM space matrix 516 includes a virtual segment 532 and a virtual segment 534.

In various embodiments, with reference to FIGS. 1-3, image 510 is an input image that resides in image space 591 and serves as input image data in the form NHWC for GPU 200. As stated previously, N is the batch size, C is the number of input channels, H is the height of the input image, and W is the width of the input image. GPU 200 utilizes the image data from image space 591 to calculate values P and Q that are used to ascertain the dimensions NPQ×K of virtual GEMM space output matrix 516 in virtual GEMM space 592.

Virtual GEMM space filter matrix 514 is a virtual GEMM space filter matrix with dimensions RSC×K whose dimensions are the result of a linearization from a KCRS filter (not shown) to the virtual GEMM space filter matrix 514. In various embodiments, KCRS filter is converted into a (RCS, K) matrix by concatenating the dimensions R, C, and S. Virtual GEMM space filter matrix segment 555 is a virtual segment of virtual GEMM space filter matrix 514 whose dimensions (RSC×b) are based on the dimensions of virtual GEMM space output matrix segment 532 and virtual GEMM space filter matrix 514.

Virtual GEMM space matrix 512 is a virtual GEMM space matrix with dimensions NPQ by RSC. Virtual GEMM space matrix segment 553 is a virtual segment of virtual GEMM space matrix 512 whose dimensions (a×RSC) are based on the dimensions of virtual GEMM space output matrix segment 532 and virtual GEMM space filter matrix 514.

Virtual GEMM space output matrix 516 is a virtual matrix that has dimensions NPQ×K. In various embodiments, as depicted, the dimensions NPQ and K and the number of compute units 214-220 available to GPU 200 are used to ascertain the partition dimensions of virtual segment 532 and virtual segment 534. Virtual GEMM space output matrix 516 is segmented or partitioned into virtual segment 532 and virtual segment 534 to be allocated for work flow by, for example, compute units 214-216. In various embodiments, the number of partitioned virtual segments in virtual GEMM space output matrix 516 may vary depending upon the number of compute units available in GPU 200. For example, in one embodiment, if there are 64 compute units available then virtual GEMM space output matrix will be partitioned into 64 virtual segments for work distribution. The use of image data in the image space and the virtual matrices in virtual GEMM space provides processing device 100 with the capability to reduce the number of access requests associated with duplicate data by accessing an internal cache hierarchy instead of global memory, while assigning convolution operations to compute units 214-220.

As used herein, a program includes any sequence of instructions (e.g., an application, a module (e.g., a stitching module for stitching captured image data), a kernel, a work item, a group of work items and the like) to be executed using one or more processors to perform procedures or routines (e.g., operations, computations, functions, processes and jobs). Processing of programmed instructions includes one or more of a plurality of processing stages, such as but not limited to fetching, decoding, scheduling for execution and executing the programmed instructions. Processing of data (e.g., video data) includes for example, sampling data, encoding data, compressing data, reading and writing data, storing data, converting data to different formats, performing calculations and controlling one or more components (e.g., encoder and decoder) to process data. Processors include, for example, multiple processing cores (e.g., compute units 214-220) each of which are configured to read and execute program instructions, such as instructions to perform matrix multiplications.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device, comprising:
memory configured to store data;
a processor configured to:
determine, based on convolutional parameters comprising padding parameters indicating whether n, h, w, c positions of an image space, of an image, along a height and width of the image space comprise padded data, a virtual general matrix-matrix multiplication (GEMM) space of a virtual GEMM space output matrix; and
generate, in the virtual GEMM space output matrix, a convolution result by matrix multiplying the data corresponding to a virtual GEMM space input matrix with the data corresponding to a virtual GEMM space filter matrix; and
convolutional mapping hardware configured to map, based on the convolutional parameters, x, y positions of the virtual GEMM space input matrix to the n, h, w, c positions of the image space using n, h, w, c memory addresses.

2. The processing device of claim 1, wherein the convolutional parameters comprise, a batch size, a number of channels, a channel depth, an image height, an image width, a filter height, a filter width, a virtual GEMM output matrix height and a virtual GEMM output matrix width, and
the convolutional mapping hardware is further configured to map the x, y positions of the virtual GEMM space input matrix to the n, h, w, c positions of the image space by providing an n, h, w, c memory address for each x, y position of the virtual GEMM space matrix, where n is the batch number, h is the height of the image space, w is the width of the image space and c is an input channel depth.

3. The processing device of claim 1, wherein the convolutional mapping hardware is further configured to:
receive the padding parameters for each position;
when an x, y position of the image space is not indicated as comprising padded data, initiate a memory access request for data corresponding to the x, y position; and
when the x, y position of the image space is indicated as comprising padded data, not initiate a memory access request for data corresponding to the x, y position.

4. The processing device of claim 1, wherein the convolutional parameters further comprise hyper parameters assigned for different portions of a program to be executed.

5. The processing device of claim 1, further comprising general purpose hardware, separate from the convolutional mapping hardware, configured to perform address calculations for the virtual GEMM space filter matrix in parallel with the mapping, by the convolutional mapping hardware, of the positions of the virtual GEMM space input matrix to the positions of the image space.

6. The processing device of claim 1, wherein the convolutional mapping hardware is configured to map the positions of the virtual GEMM space input matrix to the positions of the image space by using assumed constant values uniquely associated with the convolution.

7. A processing device, comprising:
a first processor;
a second processor in communication with the first processor, configured to:
receive an image from the first processor;
determine, based on convolutional parameters comprising padding parameters indicating whether n, h, w, c positions of an image space, of the image, along a height and width of the image space comprise padded data, a virtual general matrix-matrix multiplication (GEMM) space of a virtual GEMM space output matrix; and
generate, in the virtual GEMM space output matrix, a convolution result by matrix multiplying data corresponding to a virtual GEMM space input matrix with data corresponding to a virtual GEMM space filter matrix; and
convolutional mapping hardware configured to map, based on the convolutional parameters, x, y positions of the virtual GEMM space input matrix to the n, h, w, c positions of the image space using n, h, w, c memory addresses.

8. The processing device of claim 7, wherein the first processor is a CPU and the second processor is a GPU.

9. The processing device of claim 7, wherein the convolutional parameters comprise, a batch size, a number of channels, a channel depth, an image height, an image width, a filter height, a filter width, a virtual GEMM output matrix height and a virtual GEMM output matrix width, and
the convolutional mapping hardware is further configured to map the x, y positions of the virtual GEMM space input matrix to the n, h, w, c positions of the image space by providing an n, h, w, c memory address for each x, y position of the virtual GEMM space matrix, where n is the batch number, h is the height of the image space, w is the width of the image space and c is an input channel depth.

10. The processing device of claim 7, wherein the convolutional mapping hardware is further configured to:
receive the padding parameters for each position;
when an x, y position of the image space is not indicated as comprising padded data, initiate a memory access request for data corresponding to the x, y position; and
when the x, y position of the image space is indicated as comprising padded data, not initiate a memory access request for data corresponding to the x, y position.

11. The processing device of claim 7, wherein the convolutional parameters further comprise hyper parameters assigned for different portions of a program to be executed.

12. The processing device of claim 7, further comprising general purpose hardware, separate from the convolutional mapping hardware, configured to perform address calculations for the virtual GEMM space filter matrix in parallel with the mapping, by the convolutional mapping hardware, of the positions of the virtual GEMM space input matrix to the positions of the image space.

13. The processing device of claim 7, wherein the convolutional mapping hardware is configured to map the positions of the virtual GEMM space input matrix to the positions of the image space by using assumed constant values uniquely associated with the convolution.

14. A method comprising:
receiving an image;
determining, based on convolutional parameters comprising padding parameters indicating whether n, h, w, c positions of an image space, of the image, along a height and width of the image space comprise padded data, a virtual general matrix-matrix multiplication (GEMM) space of a virtual GEMM space output matrix;
mapping, by convolutional mapping hardware based on the convolutional parameters, x, y positions of a virtual GEMM space input matrix to the n, h, w, c positions of the image space using n, w, w, c memory addresses; and
generating, in the virtual GEMM space output matrix, a convolution result by matrix multiplying data corresponding to the virtual GEMM space input matrix with data corresponding to a virtual GEMM space filter matrix.

15. The method of claim 14, wherein the convolutional parameters comprise, a batch size, a number of channels, a channel depth, an image height, an image width, a filter height, a filter width, a virtual GEMM output matrix height and a virtual GEMM output matrix width, and
further comprising mapping the x, y positions of the virtual GEMM space input matrix to the n, h, w, c positions of the image space by providing an n, h, w, c memory address for each x, y position of the virtual GEMM space matrix, where n is the batch number, h is the height of the image space, w is the width of the image space and c is an input channel depth.

16. The method of claim 15, wherein the convolutional parameters further comprise hyper parameters assigned for different portions of a program to be executed.

17. The method of claim 14, further comprising performing, by general purpose hardware separate from the convolutional mapping hardware, address calculations for the virtual GEMM space filter matrix in parallel with the mapping of the positions of the virtual GEMM space input matrix to the positions of the image space by the convolutional mapping hardware.

18. The method of claim 14, further comprising:
receiving the padding parameters for each position;
when an x, y position of the image space is not indicated as comprising padded data, initiate a memory access request for data corresponding to the x, y position; and
when the x, y position of the image space is indicated as comprising padded data, not initiate a memory access request for data corresponding to the x, y position.

19. The method of claim 14, further comprising mapping the positions of the virtual GEMM space input matrix to the positions of the image space by using assumed constant values uniquely associated with the convolution.

20. The processing device of claim 1, further comprising a display, wherein the image is displayed on the display.

* * * * *